United States Patent
Fujita et al.

(10) Patent No.: US 6,753,092 B2
(45) Date of Patent: Jun. 22, 2004

(54) MULTILAYER MATERIAL AND MANUFACTURING METHOD OF THE SAME

(75) Inventors: Masahito Fujita, Nagoya (JP); Eisaku Inoue, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/285,481

(22) Filed: Nov. 1, 2002

(65) Prior Publication Data

US 2003/0096136 A1 May 22, 2003

(30) Foreign Application Priority Data

Nov. 1, 2001 (JP) ........................................ 2001-336574

(51) Int. Cl.[7] .................... B32B 3/10; B32B 15/20; B22F 3/105; B22F 7/04; F16C 32/00
(52) U.S. Cl. .................. 428/614; 428/553; 428/674; 428/677; 384/912
(58) Field of Search ................. 428/614, 553, 428/674, 677; 384/912

(56) References Cited

U.S. PATENT DOCUMENTS

| 4,401,727 A | 8/1983 | Berke et al. |
| 4,725,708 A | 2/1988 | Kawasaki et al. |
| 4,758,404 A | 7/1988 | Muto |
| 4,832,982 A | 5/1989 | Mori et al. |
| 5,137,792 A | 8/1992 | Hodes et al. |
| 5,495,837 A | * 3/1996 | Mitsuhashi et al. ...... 123/188.3 |

FOREIGN PATENT DOCUMENTS

| JP | 59-219425 | | 12/1984 |
| JP | 61-6284 | | 1/1986 |
| JP | 63-144884 | * | 6/1988 |
| JP | 01-205043 | * | 8/1989 |
| JP | 2-240278 | | 9/1990 |
| JP | 04-028836 | * | 1/1992 |
| JP | 5-17899 | | 1/1993 |
| JP | 06-322462 | * | 11/1994 |
| JP | 11-229103 | * | 8/1999 |

* cited by examiner

Primary Examiner—Deborah Jones
Assistant Examiner—Jason L. Savage
(74) Attorney, Agent, or Firm—Browdy and Neimark, P.L.L.C.

(57) ABSTRACT

A multilayer material comprising a backing material (10) and a obverse material (12) made of a metal different from the backing material, said obverse material being bonded to the backing material, said obverse material having a rapidly cooled dendrite structure extended substantially vertically to the backing material, said dendrite structure having a grain size not more than 0.02 mm in a cutting plane in parallel to the backing material and/or a dendrite arm spacing not more than 0.02 mm in a cutting plane vertical to the backing material.

5 Claims, 9 Drawing Sheets

MULTILAYER MATERIAL AND MANUFACTURING METHOD OF THE SAME

BACKGROUND OF THE INVENTION

The present invention relates to a multilayer material for manufacturing a plain bearing etc. and a manufacturing method of the same, and more particularly to a multilayer material whose obverse material bonded to a backing material has an orientated dendrite structure and a manufacturing method of the same.

As conventional manufacturing methods of a multilayer material for a bearing having such a structure as a copper-based bearing alloy which is an obverse material is bonded to a steel strip which is a backing material, there are a sintering method and a continuous-strip casting method.

In the sintering method, a copper alloy powder to be sintered for forming a copper-based bearing alloy is spread at a predetermined thickness onto a steel strip, they being then heated in a reducing atmosphere at 850°–900° C. so that a primary sintering thereof may be performed, thereafter they being subjected to rolling so that the density of the copper alloy powder layer may become 100%, and then they are subjected to a second sintering under the same sintering conditions as above, thereby completing the multilayer material.

In the continuous-strip casting method, a steel strip is bent into an L shape at both sides thereof so that a channel (groove) shape may be formed, it being then preheated in a reducing atmosphere up to 1,000° C., a molten copper alloy being poured into the channel while cooling the poured copper alloy from the back side thereof by oil-quenching the back side of the steel strip, thereby unidirectionally solidifying the poured copper alloy, then the L-shaped bent portions at both of the channel sides being removed by cutting while removing unnecessary portions on the copper alloy surface by grinding, and at the final step the steel strip made to have a martensitic structure by the oil-quenching is softened by heating at 800° C., whereby the multilayer material is completed.

In the sintering method, it is necessary to prepare facilities for the primary and secondary sintering, rolling, etc., and in the continuous-strip casting method it is also necessary to prepare facilities for forming the channel, preheating, etc. Thus, each of the methods requires a very long production line.

Further, in the sintering method there is such problems as a bonding strength between the copper alloy layer (obverse material) and the steel strip (backing material) is low and as the copper alloy structure becomes coarse in grain size together with the decrease in the strength due to the secondary sintering. On the other hand, in the continuous-strip casting method, there are such problems as the steel strip is hardened due to the quenching performed at the back side of the steel strip although the bonding strength between the copper alloy and the steel strip becomes high and as the copper alloy structure becomes coarse in grain size together with decrease in the strength due to a tempering performed thereafter for the softening thereof.

SUMMARY OF THE INVENTION

The present invention has been made to overcome the above problems of the prior art, and an object of the invention is to provide a multilayer material having a densified and fine structure and a high strength, and a manufacturing method of the same.

According to the first aspect of the invention, there is provided a multilayer material comprising a backing material and an obverse material of a metal different from the backing material, the obverse material being bonded to the backing material, the obverse material being provided with a rapidly solidified dendrite structure extending substantially vertically to the backing material, a grain size not more than 0.02 mm in a cutting plane in parallel to the backing material surface and/or a dendrite arm spacing not more than 0.02 mm in another cutting plane vertical to the backing material.

According to the second aspect of the invention, there is provided a method of producing the multilayer material comprising the steps of: spreading on a backing material a powder of a metal different from the backing material; irradiating the metal powder with laser beams having an energy density of 10–100 $kW/cm^2$ so that the metal powder is locally melted, while shifting successively the laser beams; and cooling just after the melting the melted portion from the back side of the backing material so that the melted portion is rapidly cooled and solidified.

A laser is suitable for the local heating, and good bonding between the obverse material and the backing material can be obtained by locally heating and melting the metal powder for bonding the melted metal to the backing material, and this local heating and melting can make the thermal influence on the other portions small. Insofar as the locally heated zone is concerned, the cooling of the heated portion can be more readily controlled. As regard the laser, it is preferred to use a semiconductor laser having a superior conversion efficiency of energy.

On the other hand, the copper-based alloy is one of materials having superior characteristics as a bearing alloy, and has a good wettability to a steel back metal and a superior bondability to steel back metal. Oxides present on the surfaces of copper-based alloy powder can reduce the reflection of the laser beam and can enhance the beam absorbency. The wavelength of the laser beams emitted from the semiconductor laser is 0.8–1.1 $\mu$m, which provides the enhanced absorbency for the copper-based alloy. That is, the combination of the copper-based alloy with the semiconductor laser is most preferable for the practice of the present manufacturing method.

In the multilayer-manufacturing method of the invention, a metal powder 11 is spread, as shown in FIG. 2, onto a backing material 10, and then the metal powder is irradiated with laser beams 5a. The metal powder in the portion irradiated with the laser beam 5a is instantaneously melted upon absorption of the laser beams 5a and changes into a sphere 11a by surface tension, as shown in FIG. 3, where the heating rate because of the laser beams becomes 800° C./sec or more. The molten portion in the state of the sphere 11a is, at the next moment, spread on the surface of the backing material 10 by gravity and is changed into a semi-sphere 11b, as shown in FIG. 4, while being cooled from the bottom side of the semi-sphere 11b through the backing material 10, so that the solidification proceeds upwards from the bottom side and a dendrite structure comes to extend vertically from the backing material 10.

Thus, in the method of the invention, the bimetal material (multilayer material) can be produced by the steps of spreading the metal powder onto the backing material, melting it by the laser beams, and quenching it, so that it becomes unnecessary to provide such facilities for the primary sintering, secondary sintering, rolling, etc. as to be used in the conventional sintering method, or it becomes unnecessary to provide such large-scale facilities for melting the metal and for cooling much amount of molten metal poured onto the steel strip as to be used in the continuous-strip casting method, whereby it becomes possible to shorten the production line. Further, since the metal powder spread on the backing material is locally melted rapidly and is successively cooled rapidly, the structure of the obverse material is densified and fine.

In the multilayer-manufacturing method of the invention, the energy density of the laser beams for bring about proper melting and solidifying conditions is made to be 10–100 kW/cm$^2$. In a case where the energy density is less than 10 kW/cm$^2$, the metal powder spread on the backing metal is not melted, whereas in another case where an energy density is more than 100 kW/cm$^2$, even the backing material is melted, resulting in failure in forming the bimetal. Thus, in the energy density range of 10 to 100 kW/cm$^2$, it becomes possible to obtain the bimetal of the obverse material and the backing material while keeping the proper bonding state between them.

In the multilayer-manufacturing method of the invention, the molten metal is rapidly cooled from the side of the backing material, so that the molten metal comes to become the dendrite structure extended substantially vertically to the backing material.

By use of the method, the multilayer material of the invention can be manufactured in which the dendrite structure of the obverse material is extended substantially vertically to the backing material, and the dendrite structure comes to become a rapidly cooled solidification structure having the grain size not more than 0.02 mm in the cutting plane in parallel to the backing material and/or the dendrite arm spacing not more than 0.02 mm at the cutting plane vertical to the backing material.

In the dendrite structure of the multilayer material, there are two cases, that is, in the first case it is possible to observe the presence of branches (arms) extended from a trunk-like portion, and in the second case it is impossible to observe these arms. For example, in the case of a copper-based alloy containing lead or bismuth or tin, the particles of lead or bismuth or tin come to be present among the arms extended from the trunk-like portion insofar as the solidified state thereof provided after the melting and cooling of the copper-based alloy powder is concerned, so that the presence of the arms can be observed. However, in another case of performing thereafter a heat treatment such as annealing etc. for the sake of the tempering, the particles of lead or bismuth can remain as they are among the arms, but the tin particles disappear by the heat treatments, so that the presence of the arms comes not to be observed in the case of the tin particles.

Thus, in the case where no presence of the arms of the dendrite structure is observed, the rapidly cooled solidification structure is evaluated, as shown in FIGS. 5A and 5B, in terms of the spacing L of the dendrite which is measured in the plane cut in parallel to the backing material, the spacing L corresponding to the grain size (expressed by the unit of millimeter) of the structure in the direction of this plane. On the other hand, in the case where it is possible to observe the arms 20 as shown in FIGS. 6A and 6B, the solidification structure is evaluated in terms of the dendrite arm spacing S (expressed by the unit of millimeter) defined between the adjacent arms in the dendrite structure. The measuring of the grain size is complied with the prescription of JIS-H-0501.

In the present multilayer material, the obverse material has the dendrite structure extended substantially vertically to the backing material. Thus, in the case of making a plain bearing by use of the multilayer material of the invention, the extending direction of the trunk-like portions in the dendrite structure coincides with the direction of a load applied from a counterpart, so that the trunk-like portions act as load-supporting poles and the plain bearing comes to have superior strength and fatigue resistance.

The obverse material has the densified and fine dendrite structure having the grain size not more than 0.02 mm and/or dendrite arm spacing not more than 0.02 mm, so that a plain bearing made of this material comes to have a superior anti-seizure property and a superior fatigue resistance. The solidified structures of a copper alloy consisting of 10 mass % tin, and 10 mass % lead, and the balance copper, which are made in accordance with the method of the invention, the conventional sintering method, and the conventional continuous-strip casting method, are shown in FIGS. 7, 8 and 9, respectively. As apparent from the comparison of FIGS. 7A and 7B with FIGS. 8A and 8B and FIGS. 9A and 9B, the obverse material of the multilayer material of the invention has the densified and fine structure. Each of FIGS. 7A, 8A and 9A shows the structure observed on a cutting plane vertical to the backing material, whereas each of FIGS. 7B, 8B and 9B shows the structure observed at another cutting plane in parallel to the backing material, in which a copper matrix is shown as black-color portions with lead being shown as white-color portions.

In the case where both of the grain size and the dendrite arm spacing of the dendrite structure exceed 0.02 mm, no further improvement of the anti-seizure property and the fatigue resistance occurs. By making the cooling rate of the metal melted by the laser beams be not less than 100° C./sec, the dendrite structure can surely become a rapidly solidified structure with a grain size not more than 0.02 mm and/or a dendrite arm spacing not more than 0.02 mm.

In the case of the multilayer material of the invention in which the copper-based alloy layer is bonded to the steel back metal layer, and it is possible to use the multilayer material as the material of a plain bearing. In this case, by containing not more than 30 mass % lead or bismuth in the copper-based alloy, the anti-seizure property of the plain bearing is improved because lead or bismuth acts as a solid lubricant. When the size of the grains of lead or bismuth is not more than 0.02 mm, it becomes possible to obtain the superior anti-seizure property and superior fatigue resistance regarding the plain bearing. In the case where the amount of lead or bismuth is more than 30 mass %, the strength of the matrix decreases because lead or bismuth is soft in hardness, and the anti-seizure property and fatigue resistance of the plain bearing decease in the case where the size of the grains of lead or bismuth exceeds 0.02 mm. That is, it is required for lead or bismuth to be uniformly dispersed and to be fine in size.

When the laser beams are made to travel over the fixed backing material on which the metal powder is spread or when the backing material on which metal powder is spread is made to travel under the fixed laser beams in the manufacturing method of the invention, the travelling speed is important to the manufacture of the multilayer material. When the travelling speed is less than 0.2 m/min, the metal powder comes to receive an excessive laser beam energy, resulting in melting of the backing material, whereas when the travelling speeds exceeds 5 m/min, no melting of the metal powder occurs, resulting in failure in the forming of the bimetal.

The travelling speed, and the heating rate and cooling rate of the metal powder give the influence of the laser heating on the depth of a heat-affected zone in the backing material.

In the conventional continuous-strip casting method, the steel strip undergoes a martensitic transformation by a rapid cooling performed at the side of the steel strip, resulting in failure in successive processing, and thus a heat treatment at elevated temperatures becomes necessary immediately after the casting. However, in the present invention, the travelling speed of the obverse material to the laser beam or vice versa, and heating rate and cooling rate regarding the metal powder or the molten metal are appropriately set so that the heat-affected zone in the backing material may be suppressed to be not more than 0.3 mm in depth.

Insofar as the depth of the heat-affected zone in the backing material is not more than 0.3 mm, the heat-affected zone does not reach the whole of the backing material, so that it becomes unnecessary to perform any tempering treatment at an elevated temperature. However, this does not deny a heat treatment for the improvement of the quality. Further, since the backing material comes to have a double layer structure comprising the heat-affected zone and the original structure zone, such an advantage as to be brought about from a composite material occurs, which is also effective in improving the strength of the backing material itself. The heat-affected zone in the backing material means a zone where the grains are made fine in grain size in comparison with that of the original structure by the rapid heating through the laser beams and the rapid cooling.

Further, it is preferred to additionally subject the thus manufactured multilayer material to a homogenizing treatment. That is, in order to remove the segregation of the components and to relieve the strains caused due to the rapid cooling in the melting-and-solidifying step, it is preferred to perform an annealing at 400°–800° C. for 1–10 hours in compliance with the intended object and the components of the material. However, even in this case, such an annealing temperature as to cause the change of the basic structure unidirectionally solidified should not be used. Particularly at an annealing temperature more than 600° C., the grain is coarsened and the strength of the material decreases.

DESCRIPTION OF THE PREFERRED EMBODIMENTS

Figure 1:
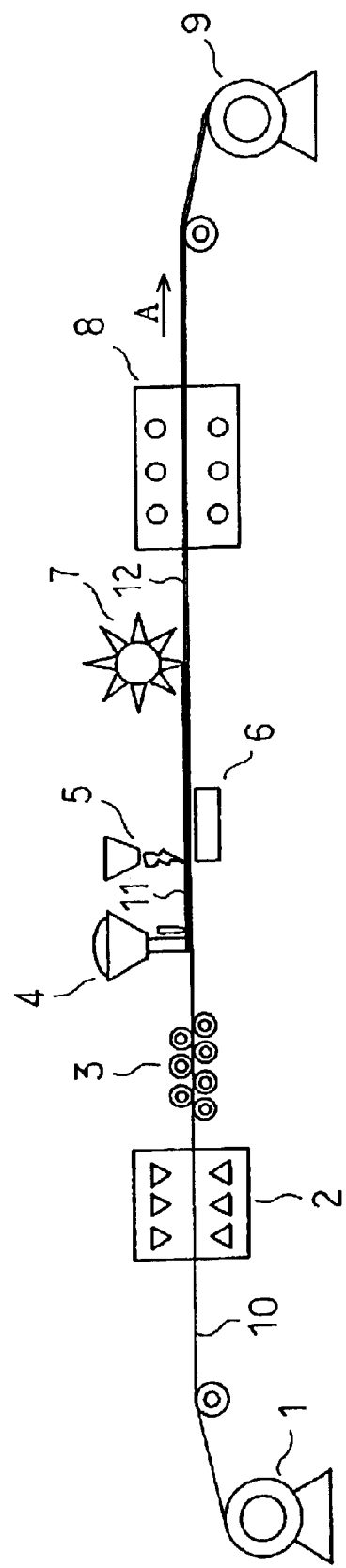
FIG. 1 is a drawing schematically showing a production line according to one embodiment of the present invention.

One embodiment of the present invention is described while referring to the drawing, the embodiment being applied to a multilayer material for a bearing, the multilayer material comprising a steel strip layer and a copper-based bearing alloy layer bonded to the steel strip layer.

In FIG. 1 schematically showing a production facility relating to the present invention, which is provided with an uncoiler 1, a washing unit 2, a leveller 3, a powder-spreading unit 4, a laser 5, a cooling unit 6, a milling machine 7, an annealing furnace 8 and a coiler 9, all of which are successively arranged in this order.

Figure 2:
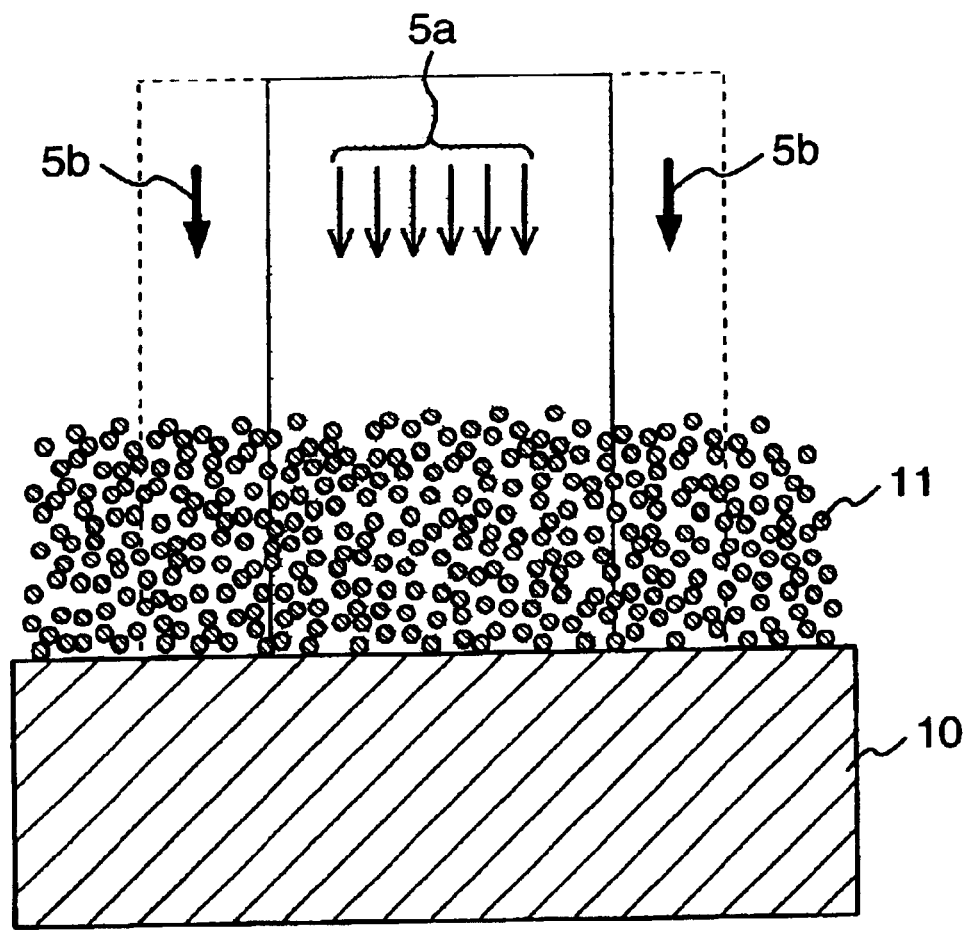
FIG. 2 is a drawing schematically showing the irradiation of the laser beams in the manufacturing method of the invention.
Figure 3:
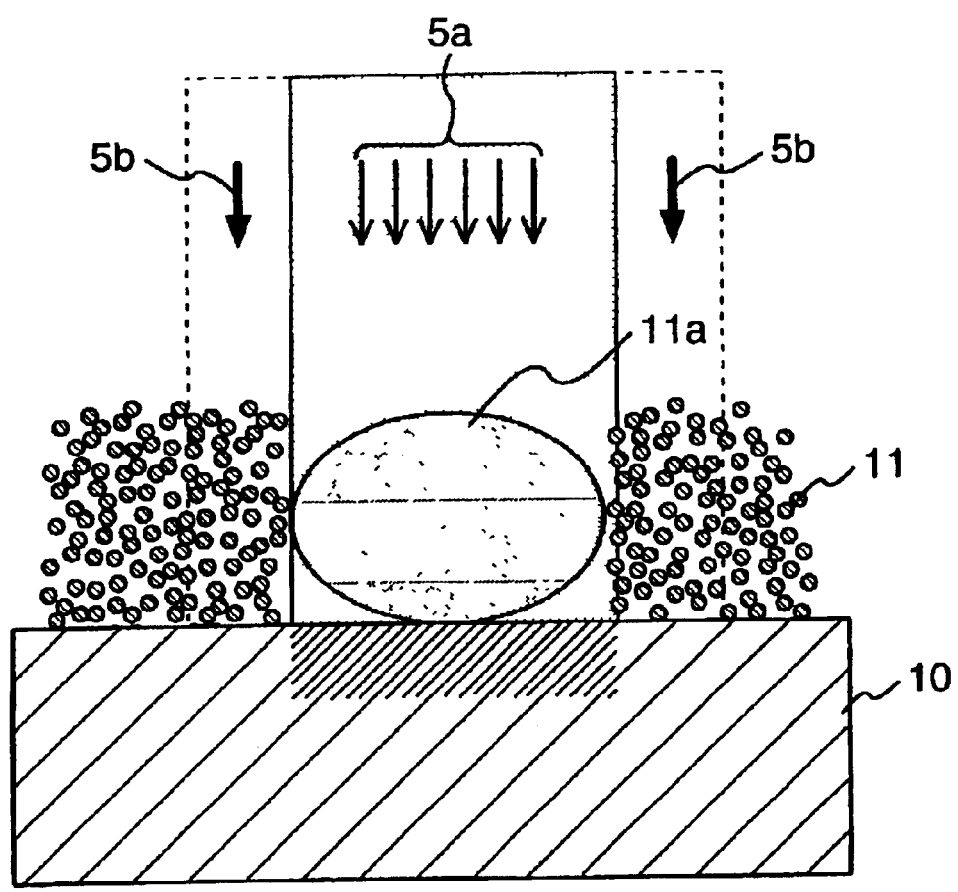
FIG. 3 is a drawing schematically showing the initial state of a molten metal occurring by the irradiation of the laser beam in the manufacturing method of the invention.
Figure 4:
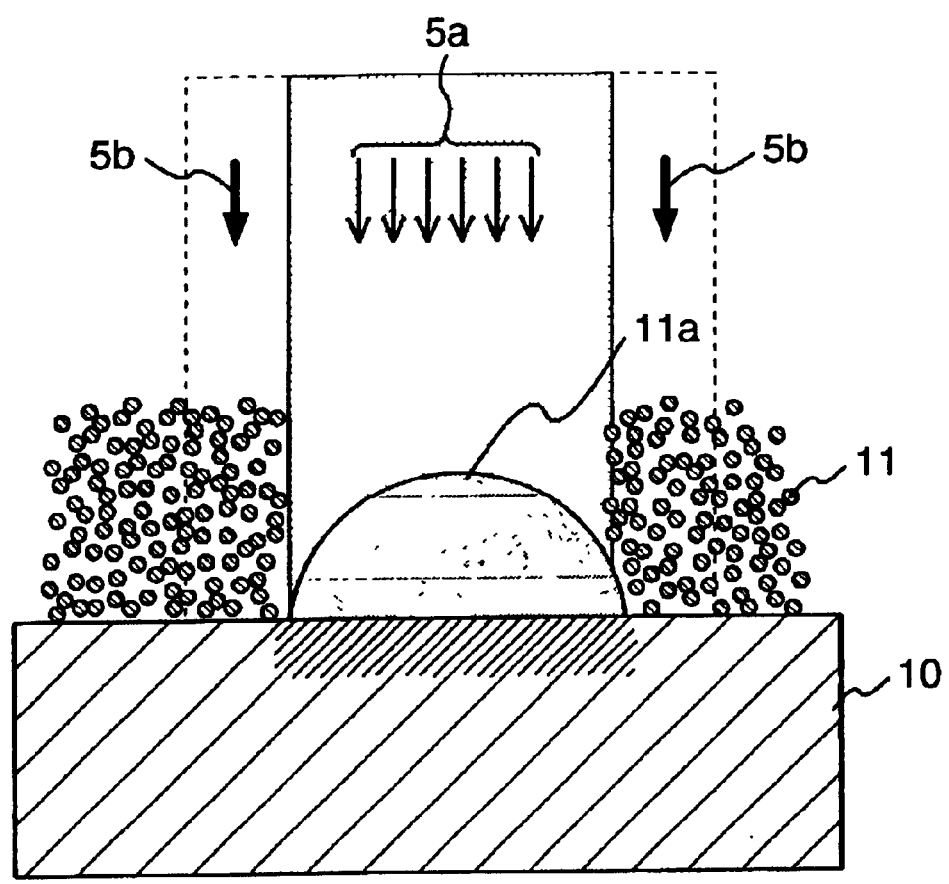
FIG. 4 is a drawing schematically showing that the molten metal comes to be in contact with the backing material by the gravity.
Figure 5A:
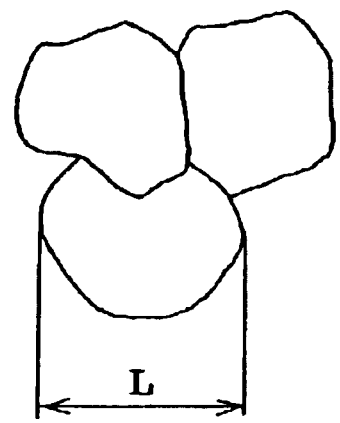
FIGS. 5A and 5B are drawings showing the grain size "L" herein used.
Figure 5B:
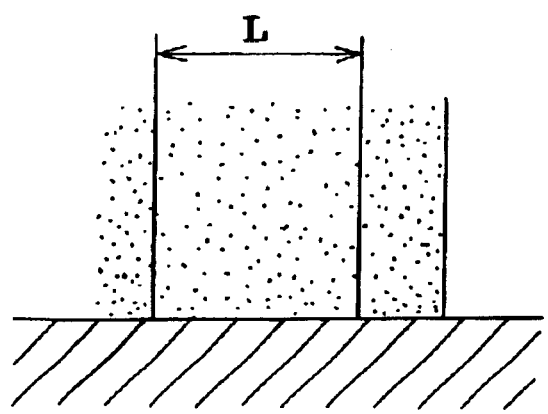
Figure 6A:
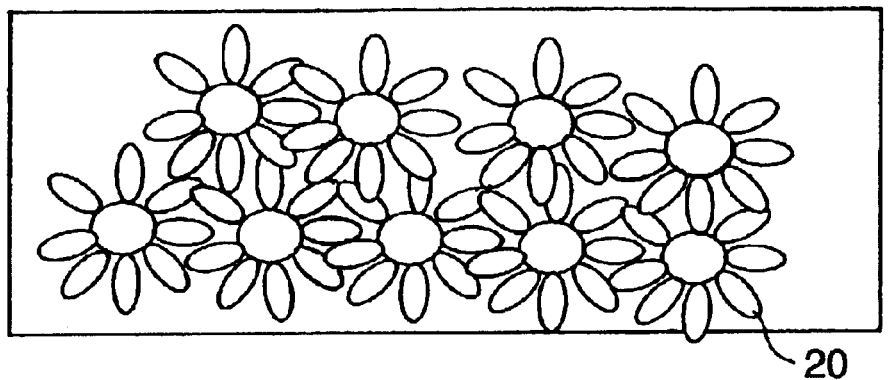
FIGS. 6A and 6B are drawings showing the dendrite arm spacing "S" herein used.
Figure 6B:
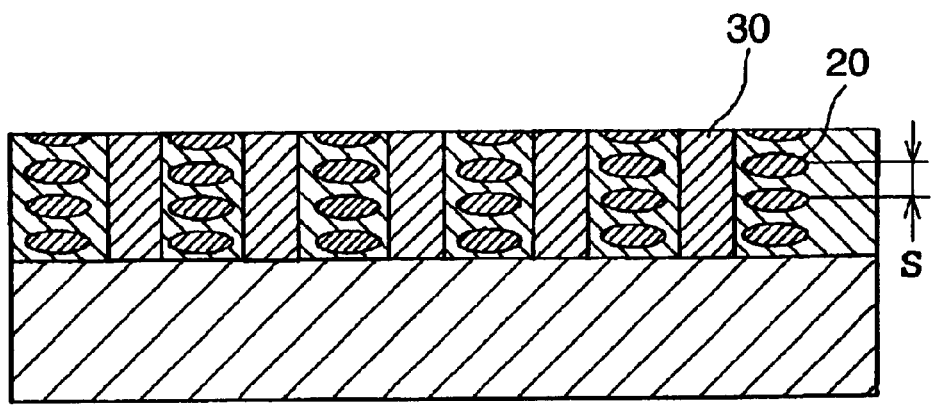
Figure 7A:
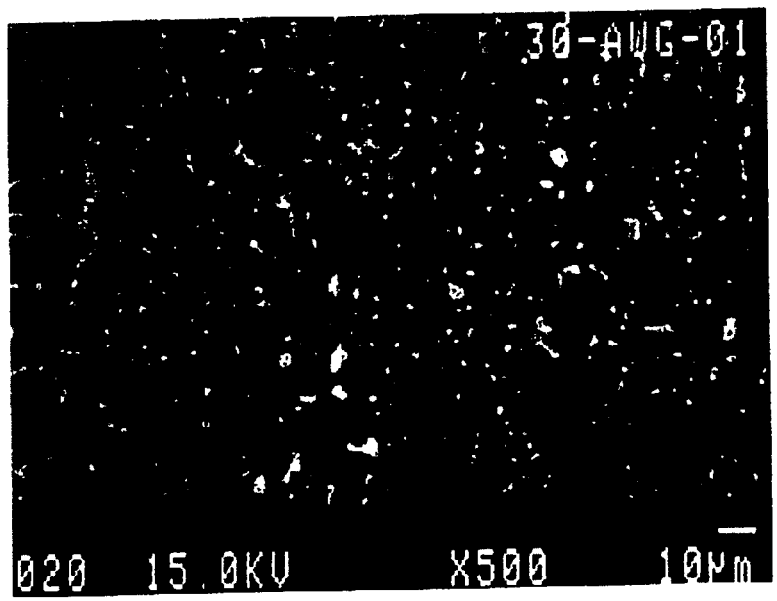
FIGS. 7A and 7B are photomicrographs showing the structure of the copper-based alloy relating to the present invention.
Figure 7B:
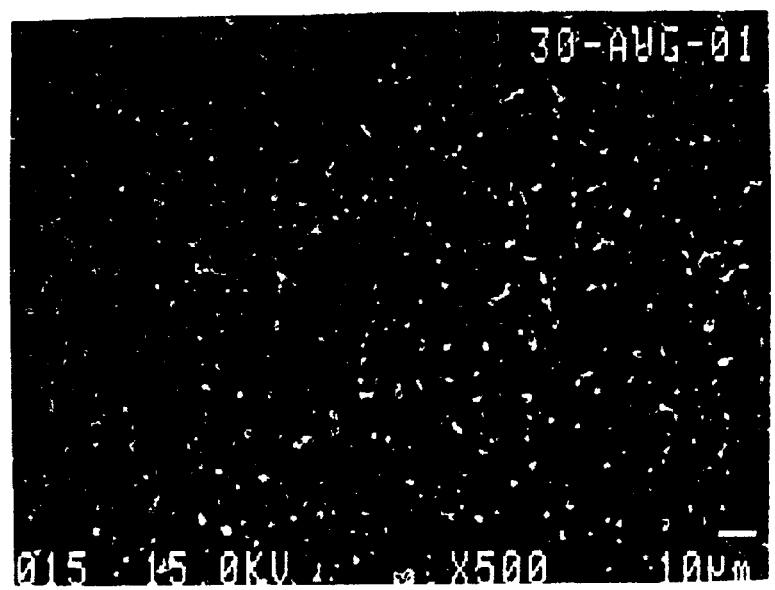
Figure 8A:
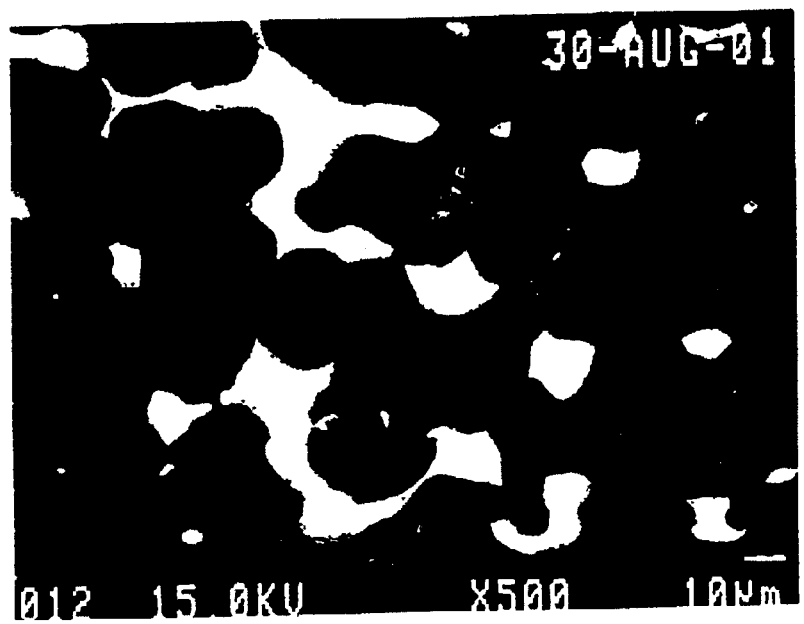
FIGS. 8A and 8B are photomicrographs showing the structure of the copper-based alloy, which corresponds to that of FIGS. 7A and 7B, provided according to the conventional sintering method.
Figure 8B:
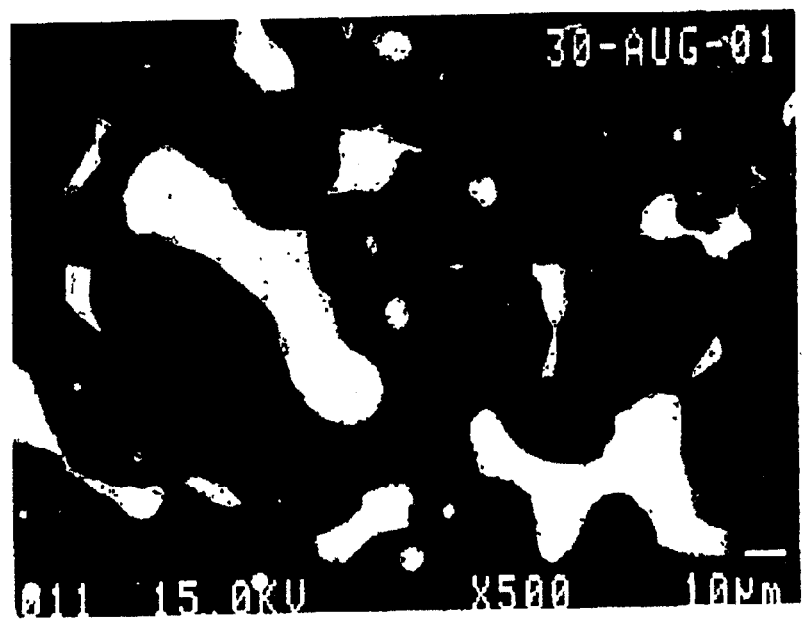
Figure 9A:
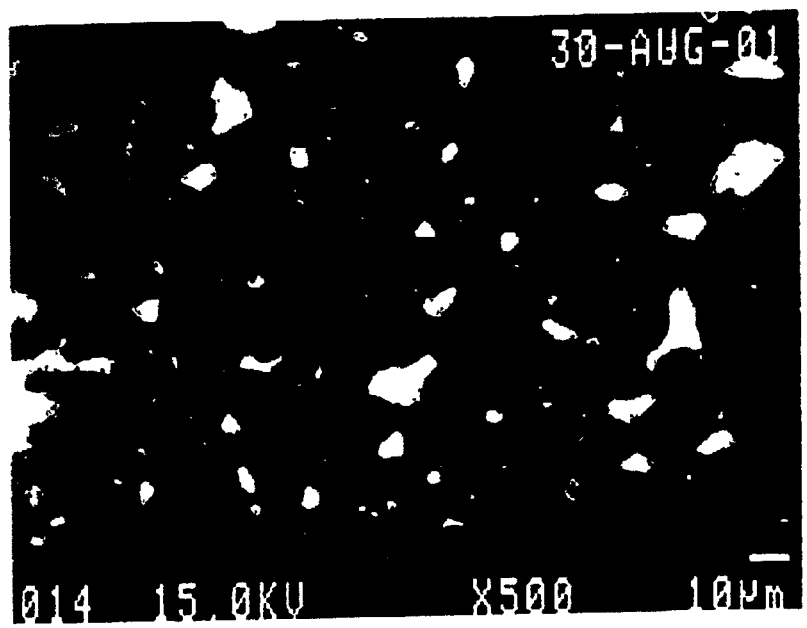
FIGS. 9A and 9B are photomicrographs showing the structure of the copper-based alloy, which corresponds to that of FIGS. 7A and 7B, provided according to the conventional continuous-strip casting method.
Figure 9B:
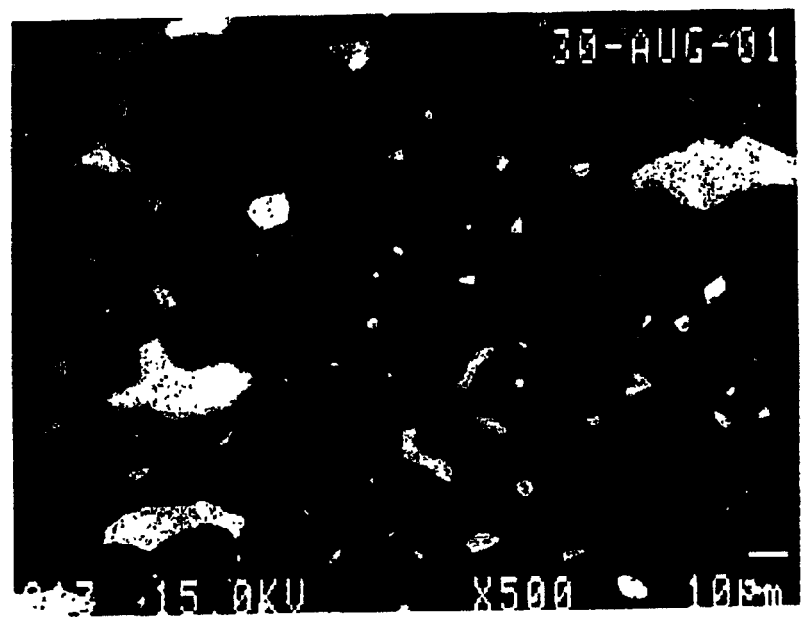

The uncoiler 1 is provided to uncoil a band-like steel strip 10 used as a backing material which was wound as a coil, and the steel strip 10 uncoiled from the uncoiler 1 is washed through the washing unit 2 and then passes through the leveller 3 so as to even out the steel strip having the tendency of curl. By the powder spreader 4 is spread a copper-based alloy powder 11 onto the steel strip 10, and the copper-based alloy powder 11 on the steel strip 10 is irradiated with laser beams 5a (see FIGS. 2, 3 and 4) from the laser 5.

The laser 5 has a plurality of semiconductor lasers integrated into one unit, and the laser beams 5a emitted from the laser 5 are made to have the cross section of a narrow, rectangular shape extended over the whole width of the band-like steel strip 10, and an assist gas 5b (shown in FIGS. 2, 3 and 4) such as an argon gas etc. is injected around the laser beams 5a having the rectangular cross section. The laser beams 5a in the rectangular cross section are irradiated onto the copper-based alloy powder 11 so that the long side of the rectangular cross section of the laser beams makes a right angle with respect to the direction "A" (FIG. 1) of the feeding of the steel strip 10. Thus, the copper-based alloy powder 11 spread on the steel strip 10 can receive the laser beams on the whole of the linear zone along the lateral portion of the steel strip 10.

The cooling unit 6 is of a water jetting type and cools through the steel strip 10 the metal melted by the laser beams. The cooling unit 6 is located under the laser 5 with the steel strip 10 being located between them, and it jets water onto a copper sheet which is in contact with the back face of the steel strip 10 to thereby cool the metal melted by the laser beams.

The milling machine 7 cuts the surface of copper-based alloy layer 12 formed as the obverse layer by the solidification of the molten copper-based alloy, so that the thickness of the obverse layer is made to be uniform. The annealing furnace 8 is used to perform an annealing of the copper-based alloy layer 12 after the milling so that the copper-based alloy layer 12 may be homogenized. The coiler 9 acts to recoil the multilayer material 13 into a coil shape after the annealing thereof.

The actual steps of manufacturing the multilayer material by use of the production facility are described below.

The steel strip 10 uncoiled from the uncoiler 1 was washed by the washing unit 2 and was then subjected to the evening-out of the curl tendency thereof through the leveller 3. Then, the steel strip 10 was led to the powder-spreading unit 4, through which the copper-based alloy powder was spread thereon. Then, the copper-based alloy powder spread on the steel strip 10 was rapidly melted by the irradiation of the laser beams emitted from the laser 5, and the molten copper-based alloy was rapidly cooled from the side of the steel strip 10 by the cooling unit 6, so that the alloy was rapidly solidified. Since the solidification proceeded from the bottom side of the molten copper-based alloy toward the upper side thereof, the dendrite structure was made to extend from the steel strip 10 substantially vertically to the steel strip 10, and the grain size thereof was controlled to be not more than 0.02 mm and/or dendrite arm spacing was controlled to be not more than 0.02 mm.

By melting and solidifying the copper-based alloy, the copper-based alloy layer 12 was bonded to the steel strip 10 with the result that the multilayer material 13 was made. Then, unnecessary portions on the surface of the copper-based alloy layer 12 were removed by the cutting performed through the milling machine 7. After that, the multilayer material 13 was annealed and recoiled on the coiler 9.

The laser 5 used in the manufacturing of the multilayer material emitted laser beams with a wavelength of 0.8 μm and an energy density of 66.8 kW/cm² at the output power of 4 kW. The travelling speed of the steel strip was 1 m/min, the thickness of the steel strip 10 being 2 mm, the copper-based alloy powder was provided with a spherical shape having an average diameter of 100 μm, and the thickness of the copper-based alloy powder spread on the steel strip 10 was 1 mm.

In Table 1 are shown the results of comparing the embodiment of the present invention with the conventional sintering method and the conventional continuous-strip casting method with respect to the length of the line of the production facilities and an operation time per a unit length of the multilayer material. From Table 1, it is apparent that the production line according to the invention can be considerably shortened with a better manufacturing efficiency in comparison with the conventional two methods.

TABLE 1

| Manufacturing method | Total line length | Operation time per unit length (min/m) |
|---|---|---|
| The conventional sintering method | 70 m | 35 |
| The conventional continuous-strip casting method | 90 m | 23 |
| The method of the invention | 15 m | 15 |

Further, the tests of the alloy strength and the shear strength were performed with respect to the products of the invention and the conventional products manufactured by the conventional sintering method and by the conventional continuous-strip casting method, the results of the tests being shown in Table 2. In the alloy strength test, each of test pieces was made by preparing a test piece portion from the multilayer material and then by removing from the test piece portion a steel strip layer so that only the copper-based alloy layer may remain which was to be used as the test piece, and a tensile strength test was performed by use of the test piece. In the shearing strength test, there were prepared test pieces each made by forming a pair of slits provided at an interval of 5 mm one of which was extended from the copper-based alloy side to the boundary thereof and another of which was extended from the steel strip side to the boundary thereof, and the test of the shear strength (bonding strength) between the copper-based alloy layer and the steel backing layer was performed.

TABLE 2

| Manufacturing method | Alloy strength (N/mm²) | Shear strength (N/mm²) |
|---|---|---|
| The conventional sintering method | 235 | 199 |
| The conventional continuous-strip casting method | 270 | 255 |
| The method of the invention | 285 | 274 |

As apparent from Table 2, the copper-based alloy layer relating to the present invention has the highest strength and also the highest bonding strength regarding the steel backing layer.

Further, the grain size of the dendrite structure of the copper-based alloy layer and the grain size of Pb grains dispersed therein were measured regarding each of the inventive examples of the multilayer materials manufactured by bonding each of the copper-based alloys having the compositions shown in Table 3 to the steel strip according to the method of the invention and regarding each of the comparative examples thereof prepared according to the conventional sintering method and the conventional continuous-strip casting method, the results thereof being disclosed in Table 3. Further, each of the inventive multilayer materials and the comparative multilayer materials was worked into half bearings, regarding which were then performed the seizure test and the fatigue test, the results thereof being also disclosed in Table 3. In Tables 4 and 5 are disclosed the conditions of the seizure test and the fatigue test, respectively.

TABLE 3

| No | Alloy composition (mass %) | Manufacturing method *) | DAS **) (mm) | Grain size (mm) | Pb grain size (mm) | Seizure load (MPa) | Specific load of fatigue (MPa) |
|---|---|---|---|---|---|---|---|
| 1 | Cu-10Sn | ① | 0.054 | 0.040 | — | 35 | 90 |
| 2 | Cu-10Sn | ② | 0.060 | 0.055 | — | 35 | 120 |
| 3 | Cu-10Sn | ③ | 0.018 | 0.015 | — | 40 | 150 |
| 4 | Cu-10Sn-0.2P | ① | 0.048 | 0.040 | — | 40 | 110 |
| 5 | Cu-10Sn-0.2P | ② | 0.055 | 0.055 | — | 50 | 130 |
| 6 | Cu-10Sn-0.2P | ③ | 0.017 | 0.015 | — | 70 | 150 |
| 7 | Cu-10Sn-10Pb | ① | 0.043 | 0.038 | 0.055 | 90 | 100 |
| 8 | Cu-10Sn-10Pb | ② | 0.050 | 0.042 | 0.040 | 95 | 120 |
| 9 | Cu-10Sn-10Pb | ③ | 0.015 | 0.010 | 0.008 | 105 | 140 |
| 10 | Cu-3Sn-23Pb | ① | 0.048 | 0.045 | 0.045 | 110 | 85 |
| 11 | Cu-3Sn-23Pb | ② | 0.062 | 0.050 | 0.060 | 110 | 110 |
| 12 | Cu-3Sn-23Pb | ③ | 0.018 | 0.015 | 0.012 | 135 | 125 |
| 13 | Cu-11Sn-5Pb-3Ni | ① | 0.045 | 0.053 | 0.031 | 85 | 110 |
| 14 | Cu-11Sn-5Pb-3Ni | ② | 0.050 | 0.046 | 0.046 | 85 | 130 |
| 15 | Cu-11Sn-5Pb-3Ni | ③ | 0.019 | 0.016 | 0.015 | 95 | 150 |
| 16 | Cu-20Zn-7Pb-3Mn-1Si | ① | 0.057 | 0.055 | 0.029 | 100 | 120 |
| 17 | Cu-20Zn-7Pb-3Mn-1Si | ② | 0.055 | 0.061 | 0.040 | 120 | 150 |
| 18 | Cu-20Zn-7Pb-3Mn-1Si | ③ | 0.012 | 0.017 | 0.011 | 135 | 170 |
| 19 | Cu-10Sn-10Bi | ① | 0.046 | 0.035 | 0.050 | 80 | 100 |
| 20 | Cu-10Sn-10Bi | ② | 0.040 | 0.042 | 0.045 | 85 | 120 |
| 21 | Cu-10Sn-10Bi | ③ | 0.008 | 0.010 | 0.009 | 100 | 140 |

*) The numbers of the manufacturing method are as follows:
① the conventional sintering method;
② the conventional continuous-strip casting method; and
③ the method of the invention
**) The mark "DAS" means the dendrite arm spacing.

TABLE 4

Seizure Test

| | |
|---|---|
| Testing machine | Static load seizure testing machine |
| Revolution rate | 2000 r.p.m |
| Testing time | 10 minutes for each load, which is raised step-wise by 5 MPa |
| Peripheral speed | 4.2 m/sec |
| Feed oil temperature | 100° C. |
| Feed oil rate | 20 cc/min |
| Lubricating oil | #20 Straight motor oil |
| Oil clearance | 0.04–0.06 mm |
| Judgement of seizure | The state in which the back face temperature of the bearing exceeds 200° C. or in which the overload of a motor occurs is judged to be the occurrence of seizure. |

TABLE 5

Fatigue Test

| | |
|---|---|
| Testing machine | Dynamic load fatigue testing machine |
| Revolution rate | 3300 r.p.m |
| Testing time | 20 hours |
| Peripheral speed | 9.0 m/sec |
| Feed oil temperature | 120° C. |
| Feed oil pressure | 0.3 MPa |
| Lubricating oil | #20 Motor oil |
| Oil clearance | 0.04–0.06 mm |
| Judgement of fatigue | A specific load at which at least 5% of the area of the bearing is damaged by fatigue is judged to be the specific load of fatigue. |

From Table 3, it is understood that each of the products of the invention is fine in grain size with the Pb grain size being also fine, so that the anti-seizure property and fatigue resistance of each of the products become superior.

The invention is not limited to the embodiments described above and shown in the drawings, but may have the following changes and modifications:

The obverse material is not limited to copper-based alloys and the backing material is not limited to steel.

It is not always necessary to perform the annealing.

In the dendrite structure of the obverse material, the grain size not more than 0.02 mm in the cutting plane in parallel to the backing material and/or the dendrite arm spacing not more than 0.02 mm in the cutting plane vertical to the backing material are measured regarding the product before the annealing, and the values of the grain size and the dendrite arm spacing are varied after the annealing.

What is claimed is:

1. A multilayer material comprising a steel backing material and a copper-based alloy obverse material, the obverse material being bonded to the backing material, the obverse material being provided with a rapidly solidified dendrite structure extending substantially vertically to the backing material, and having a grain size not more than 0.02 mm in a cutting plane in parallel to the backing material surface and/or a dendrite arm spacing not more than 0.02 mm in another cutting plane vertical to the backing material.

2. A multilayer material according to claim 1, wherein the copper-based alloy contains lead or bismuth in an amount to enhance at least one of seizure resistant and fatigue, but not more than 30 mass %, which is made to be fine in size with a grain size not more than 0.02 mm and is dispersed in the solidified structure.

3. A multilayer material according to claim 2, wherein the obverse material is bonded to the backing material by solidifying the molten obverse material on the backing material, and a depth of a heat-affected zone of the backing material which zone is extended from a bonding interface between the obverse material and the backing material is not more than 0.3 mm.

4. A multilayer material according to claim 3, wherein the thus obtained multilayer material is used for a slide bearing.

5. A multilayer material according to claim 1, wherein the obverse material is bonded to the backing material by solidifying the molten obverse material on the backing material, and a depth of a heat-affected zone of the backing material which zone is extended from a bonding interface between the obverse material and the backing material is not more than 0.3 mm.

* * * * *